(12) United States Patent
Walton

(10) Patent No.: US 8,959,589 B2
(45) Date of Patent: Feb. 17, 2015

(54) SYSTEM AND METHOD FOR SERVER-BASED IMAGE CONTROL

(71) Applicant: Power Software Solutions Ltd., Reading (GB)

(72) Inventor: Tim Stephen Walton, Evesham (GB)

(73) Assignee: Power Software Solutions Ltd., Reading (GB)

( * ) Notice: Subject to any disclaimer, the term of this patent is extended or adjusted under 35 U.S.C. 154(b) by 164 days.

(21) Appl. No.: 13/654,951

(22) Filed: Oct. 18, 2012

(65) Prior Publication Data

US 2013/0097670 A1   Apr. 18, 2013

Related U.S. Application Data

(60) Provisional application No. 61/548,504, filed on Oct. 18, 2011.

(51) Int. Cl.
*H04L 29/06* (2006.01)
*G06F 17/30* (2006.01)

(52) U.S. Cl.
CPC .......... *G06F 17/30902* (2013.01); *H04L 63/10* (2013.01); *G06F 17/30905* (2013.01)
USPC .......................................................... 726/3

(58) Field of Classification Search
CPC .................... G06F 17/30902; G06F 17/30905; H04L 63/10
USPC .......................................................... 726/3
See application file for complete search history.

(56) References Cited

U.S. PATENT DOCUMENTS

| | | | |
|---|---|---|---|
| 7,502,806 B2 * | 3/2009 | Svendsen et al. | 1/1 |
| 8,667,054 B2 * | 3/2014 | Tahan | 709/203 |
| 8,731,973 B2 * | 5/2014 | Anderson et al. | 705/4 |
| 2003/0023878 A1 * | 1/2003 | Rosenberg et al. | 713/201 |
| 2005/0091511 A1 * | 4/2005 | Nave et al. | 713/185 |
| 2006/0041554 A1 * | 2/2006 | Svendsen et al. | 707/9 |
| 2006/0209349 A1 * | 9/2006 | Tabata | 358/3.28 |
| 2007/0130327 A1 * | 6/2007 | Kuo et al. | 709/224 |
| 2008/0144974 A1 * | 6/2008 | Bhakta et al. | 382/298 |
| 2013/0332856 A1 * | 12/2013 | Sanders et al. | 715/753 |

OTHER PUBLICATIONS

International Search Report and Written Opinion; Mailed Feb. 20, 2013 for corresponding PCT Application No. PCT/EP2012/070603.

* cited by examiner

*Primary Examiner* — Michael S McNally
(74) *Attorney, Agent, or Firm* — Mendelsohn, Drucker & Dunleavy, P.C.; Kevin M. Drucker

(57) ABSTRACT

In one embodiment, a server-implemented method for providing an image file. The server receives a uniform resource locator (URL) containing identification of a requested image file for display within the browser of a user, the URL including criteria specified by one or more parameters relating to the size and/or format of the image file to provide. The server determines whether a cached version of the requested image file satisfying the one or more criteria exists. If so, then the server provides the cached version of the requested image file for display within the browser of the user. If not, then the server (i) generates a processed image file by modifying a stored version of the requested image file based on the one or more criteria; (ii) stores a cached version of the processed image file; and (iii) provides the processed image file for display within the browser of the user.

18 Claims, 5 Drawing Sheets

SYSTEM AND METHOD FOR SERVER-BASED IMAGE CONTROL

CROSS-REFERENCE TO RELATED APPLICATION

This application claims priority to U.S. Provisional Patent Application Ser. No. 61/548,504, filed Oct. 18, 2011, the disclosure of which is incorporated herein by reference in its entirety.

BACKGROUND

During a typical web-browsing session, pages containing hypertext-markup language (HTML) code are provided to a user's browser by one or more web servers. Such pages normally contain HTML code pointing to an image file, which causes that image file to be displayed within the user's browser. The existing file type and size of an image file is not always appropriate for all users and all situations. For example, a user having a visual disability might be better suited to see larger images in his or her browser, while a user of a mobile device might be better suited to see smaller images in his or her browser. Additionally, when an image file is updated, there are typically a number of portions of HTML code that are updated to reflect the identity of the updated image file, which code updates are made each time that the image file is updated. Further, there is a need to provide security capabilities to discourage the copying of proprietary image files and provide a way to authenticate the source of an image file. Conventional browsing and image-delivery methods fail to address the foregoing problems.

SUMMARY

Embodiments of the disclosure address the foregoing problems by providing schemes for providing image files in varying formats and sizes to different users, reducing or eliminating the need to update web page code each time images are updated, and providing security and authentication for image files.

The following description sets forth exemplary embodiments of server-based systems and methods for displaying and controlling access to image files, such as .jpg files referenced in links contained within HTML pages viewed using a standard web browser.

In one embodiment, the disclosure provides a server-implemented method for providing an image file. The server receives a uniform resource locator (URL) containing identification of a requested image file for display within the browser of a user, the URL including criteria specified by one or more parameters relating to the size and/or format of the image file to provide. The server determines whether a cached version of the requested image file satisfying the one or more criteria exists. If so, then the server provides the cached version of the requested image file for display within the browser of the user. If not, then the server (i) generates a processed image file by modifying a stored version of the requested image file based on the one or more criteria; (ii) stores a cached version of the processed image file; and (iii) provides the processed image file for display within the browser of the user.

Exemplary embodiments of the disclosure may contain one or more of the following features, which will be discussed in further detail below:

(i) the use of dynamic links to serve and deliver images in potentially-different formats and at potentially-different sizes using only a single original source image;

(ii) the use of right-click control to minimize or eliminate copying of source images and to encourage linking in a manner consistent with embodiments of the disclosure;

(iii) the use of a custom library that enables the use of single-word effects, such as class="zoom" to enable certain features;

(iv) the use of user-defined visible watermarks in displayed images;

(v) the use of user-defined invisible watermarks in displayed images;

(vi) the ability to prevent a whole image from being delivered to a browser by overlaying a plurality of different portions of the image, to minimize or eliminate copying of source images;

(vii) the ability to include dynamic content in logos, design marks, and the like, so as to minimize or eliminate fraudulent use; and (viii) the ability to validate the legitimacy of logos, design marks, and the like, on a website.

DETAILED DESCRIPTION

Figure 1:
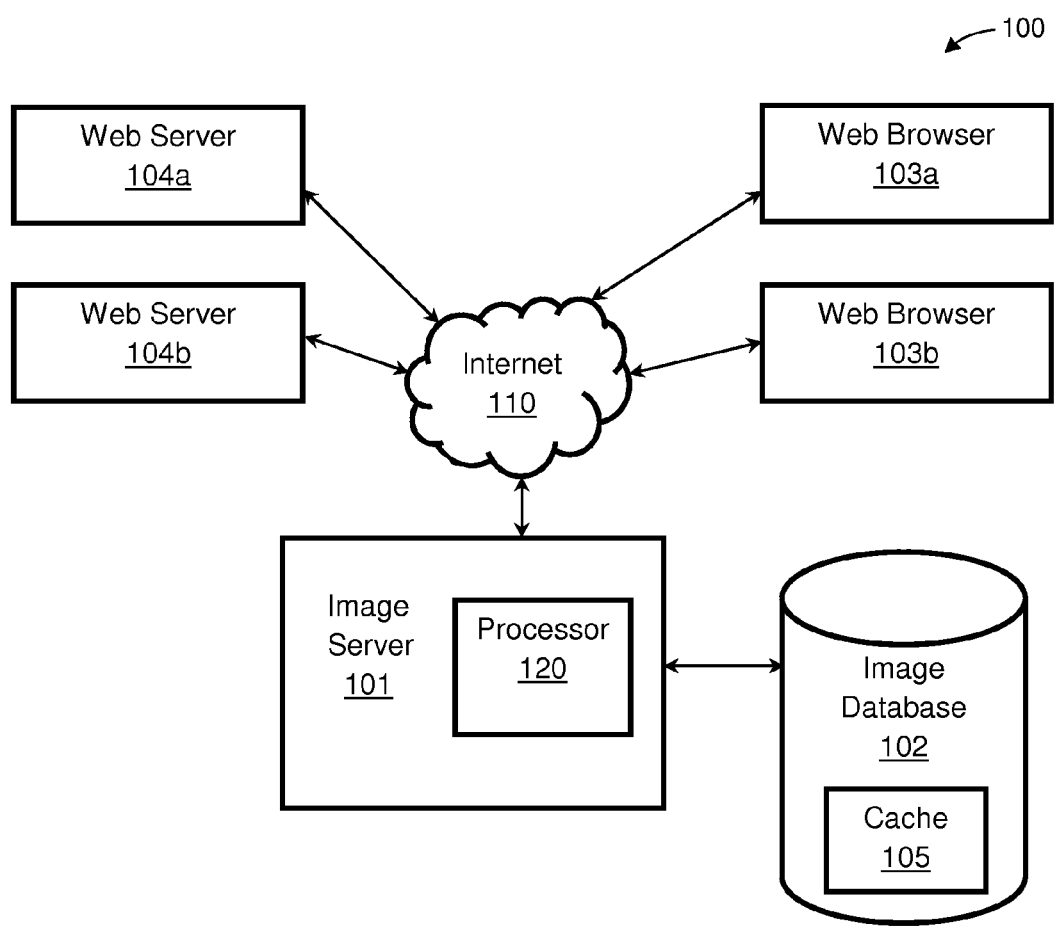
FIG. 1 is a system diagram of an exemplary image-control system consistent with one embodiment of the disclosure.

FIG. 1 shows an exemplary image-control system 100 consistent with one embodiment of the disclosure. As shown, system 100 includes an image server 101 coupled to an image database 102, a portion of which serves as the server's cache 105. Image server 101 has a processor 120 adapted to perform functions based on software instructions, to implement the functionality described in various embodiments of the disclosure herein. Image server 101 is in communication, via the Internet 110, with one or more web browsers 103a, 103b and one or more web servers 104a, 104b. Web browsers 103a, 103b are used, e.g., by users browsing websites hosted by web servers 104a, 104b. Web servers 104a, 104b contain the underlying data employed by image server 101 to serve images to users via web browsers 103a, 103b, as will be discussed in further detail below. In the following discussion, although reference is made to images being stored on and served from database 102, it should be understood that such operations take place via image server 101, which contains and executes appropriate software to achieve such functionality, as will now be described in further detail.

Single-Source Imaging with Dynamic Links

In one embodiment, image-control system 100 serves as a digital asset manager (DAM) allowing the storage of images in image database 102, in project groupings, in a number of different formats, e.g., JPG, PNG and native Photoshop PSD files. The storage of such images in image database 102 is accessible via is the Internet 110. Whereas, in conventional DAMs, images are copied away from the DAM, embodiments of the disclosure instead use a dynamic linking method. Dynamic linking makes reference to a single source image and delivers an image to the user in a size and format of their choosing. Despite the delivered image being in a potentially different format and at a different size with respect to the original source image, the delivered image remains linked (subject to its destination being on an Internet-enabled device). The resizing and reformatting takes place in real time by means of a caching system (maintained in image server 101 and/or image database 102) to maintain system speed. Source images can include layers, guides, and transparency data. Further, a source image can be stored at a relatively high resolution, even if not all users to whom the image will be served will actually see the image at that high a resolution.

The size and format for delivering the requested image can be easily modified by editing the URL, i.e., the path, to the dynamically-linked, single-source image. The URL has clearly identifiable portions that identify the height, width and format of the image to deliver. As a first example, the following URL might be used:

http://www.yoshki.com/mycompany/myproject/200/300/mylogo.png

In this first example, the URL refers to an image file named mylogo.png hosted at image database 102 (addressable via the domain www.yoshki.com), wherein the parameters "200" and "300" respectively represent the width and the height of the image to deliver. As a second example, the following URL might be used:

http://www.yoshki.com/mycompany/myproject/500/375/mylogo.jpg

In this second example, the URL refers to an image file named mylogo.jpg hosted at image database 102 (addressable via the domain www.yoshki.com), wherein the parameters "500" and "375" respectively represent the width and the height of the image to deliver. (It is noted that, although parameters such as image height and width appear in plain text form in the foregoing URL examples, such parameters can alternatively be encoded or encrypted within the URL, in a proprietary form, to prevent the parameters from being parsed, viewed, changed, or otherwise exploited by unauthorized third parties).

The links in both of the foregoing examples refer to the same single-source image (which is stored in only a single format, such as PNG), but each of the two links will deliver the image in a different size and format, while maintaining a fixed link to the server on which the image is stored. This fixed link enables at least the following features:

First, image server 101 records a log of all image use, including the web server and page being browsed by the user (i.e., from which a request was made using the link to display the image to the user), as well as identification and details of the various users who visit the hosting website and are the recipients of images being served by image server 101.

Second, image server 101 maintains one or more whitelists and/or blacklists to permit blocking of images, based on identification of certain web servers and/or certain users (e.g., by IP address or URL).

Third, based on certain criteria (e.g., for certain websites or for images exceeding a certain size), image server 101 adds a visible or invisible watermark or other annotation to certain images prior to serving them to users (as will be discussed in further detail below).

Fourth, a single change to the source image stored in image database 102 will instantly result in the updated image being served in any requested size and/or format to a user on any Internet-enabled device.

Figure 2:
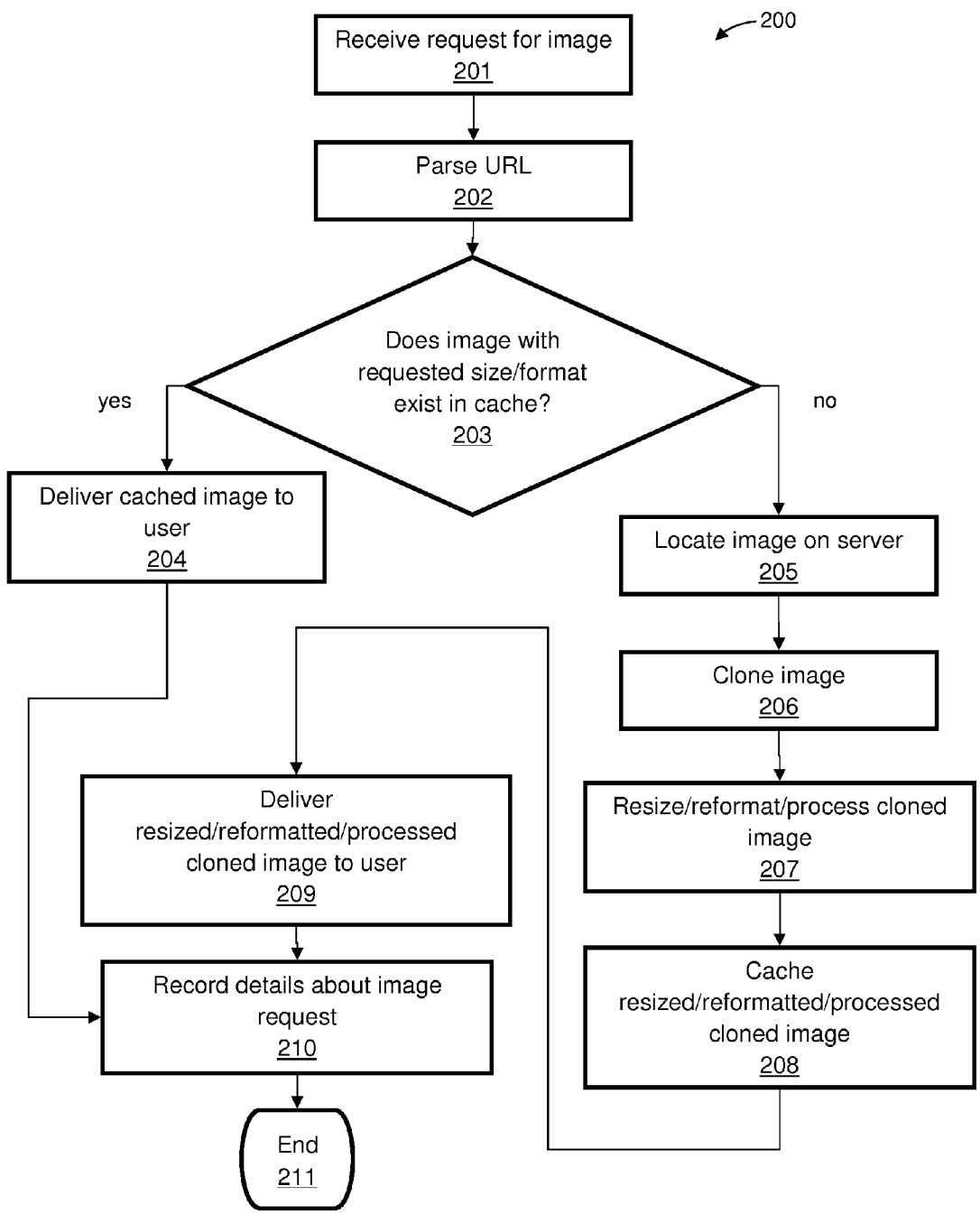
FIG. 2 is a flowchart of an exemplary process for retrieving a stored image in a single-source imaging system employing dynamic links, in one embodiment of the disclosure.

FIG. 2 shows a flowchart of an exemplary process 200 for retrieving a stored image in a single-source imaging system employing dynamic links, in one embodiment of the disclosure. First, at step 201, image server 101 receives a request to serve an image, where the request is in the form of a URL, such as http://www.yoshki.com/mycompany/myproject/500/375/mylogo.jpg. Next, at step 202, image server 101 parses the URL, looking for height, width, and format information, in order to identify the appropriate output-image parameters. Next, at step 203, image server 101 checks the server's cache 105 of images stored within image database 102, to determine whether an exact image having the requested size and format already exists in the database. If the image already exists in the requested size and format, then, at step 204, that image is delivered to the user from image server 101, and the process continues at step 210. If the image does not already exist in the requested size and format, then, at step 205, the source image is located within the repository of image server 101. Next, at step 206, a clone of the source image is made. Next, at step 207, the cloned image is resized and reformatted according to the URL request. During step 207, the correct image-size ratio is preserved (although in alternative embodiments, the aspect ratio of requested images can be changed, such as by passing an additional parameter along with width and height as part of the URL, indicating whether or not to maintain the original image-size ratio when resizing). Since the original source image is typically stored in a relatively high-resolution format, the quality of the resized output image will be as near as possible to that of the original image, given the constraints provided in the URL request. Additional image processing may also take place during step 207. For example, as will be discussed in further detail below, a visible or invisible watermark can be added to the image, the image can be date/time-stamped, or the like. At step 208, the resized/reformatted/processed cloned image is then stored in the server's cache 105 within image database 102. Next, at step 209, the resized/reformatted/processed cloned image is delivered to the requestor. At step 210, details of the image request are recorded in the server's database, including the referrer details, IP address, date/time, and the like. At step 211, the process terminates.

Figure 3:
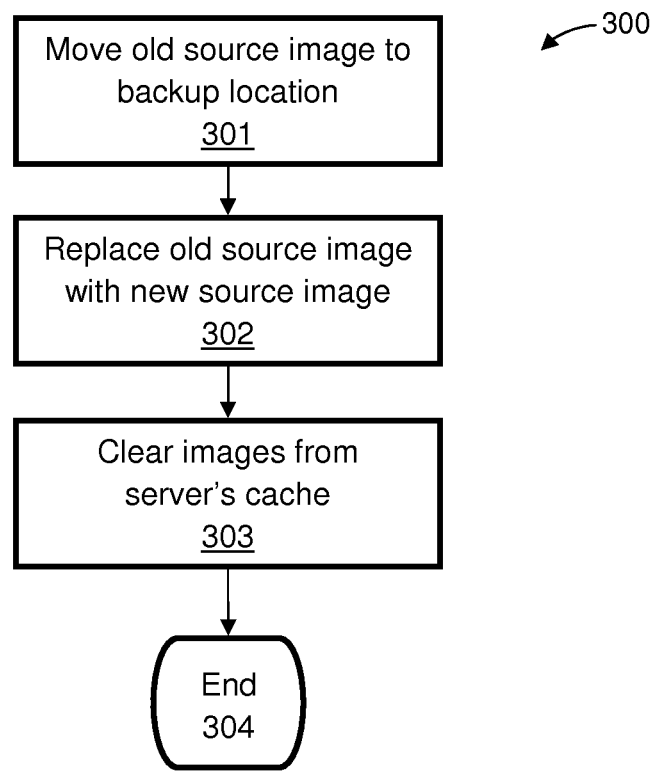
FIG. 3 is a flowchart of an exemplary process for the owner of a stored image to update the stored image, in a single-source imaging system employing dynamic links, in one embodiment of the disclosure.

FIG. 3 shows a flowchart of an exemplary process 300 for the owner of a stored image to update the stored image, in a single-source imaging system employing dynamic links, in one embodiment of the disclosure. First, at step 301, the old source image in image database 102 is moved to a backup location. Next, at step 302, the new source image is stored at the same location in which the old source image was stored, with the same filename. Next, at step 303, the portion of the image server's cache 105 containing resized/reformatted/processed clones of the old image is cleared. At step 304, the process terminates. When a request for retrieving a stored image arrives, whether from an existing URL or a new URL, the system will determine (e.g., at step 203 of FIG. 2) that the area in the cache 105 corresponding to that image is empty and will cause a new clone of an appropriate size and format to be created (e.g., at steps 206 and 207 of FIG. 2). The overall effect of this cache-clearing technique is that the first time an image is viewed in a user's browser after an update by the image owner has taken place, that image is replaced with a new, updated version. The outward appearance to the browsing user is that all images in all formats and sizes are instantly updated to the new version.

Right-Click Control

In one embodiment, a Javascript library is used to enable "right-click control." By linking to the Javascript library, e.g., using a single line in the header of a web page, right-click control over an image can be provided when the image is viewed on Javascript-enabled browsers. In this scenario, when the image is right-clicked, the standard browser menu is replaced with a custom message. This message is user-definable and can describe how to link to the image in a manner consistent with embodiments of the disclosure, to give the image owner control over all image usage across the Internet.

Javascript provides various functions for overriding the right-click menu within a browser. Embodiments of the disclosure use these functions to replace the right-click menu with a pop-up message. This permits the default menu, which contains such functions as "copy image," cannot be accessed on a Javascript-enabled device. Instead, the right-click menu is replaced with a snippet of HTML code that causes a pop-up window to appear, containing any user-definable message. Typically, the message will be designed to encourage the user to not appropriate the image in a traditional manner, but to instead use a link consistent with embodiments of the disclosure (e.g., in the form of a URL, such as http://www.yoshki.com/mycompany/myproject/500/375/mylogo.jpg). The message might also give specific image-usage terms and conditions. In such embodiments, the right-click override applies to images stored in image database 102, and not to the calling website as a whole. Additionally or alternatively, a small segment of Javascript code can also be used to prevent an image from being copied by a user simply by dragging the image from the browser onto the user's desktop.

Single-Word Effects

In one embodiment, the inclusion of the Javascript library on a website enables "single-word effects" to be used. For example, to enable a zoom feature, a user might add the following function:

class="zoom"

Through this same type of single-word function, the Javascript library is able to replace the image with a Flash animation of the image, a JQuery-based animation of the image, or some other format for rendering the image. In fact, any code can be injected into the webpage via the Javascript library, based on single-word definitions.

Additionally, through this method, any data stored with an image can be included in galleries and effects. For example, a user could hover over an image of an item for sale to see its price and description.

The Javascript library "injects" code into a page by modifying the Document Object Model (DOM) using Javascript. Certain classes are searched for within the HTML of the calling page, and this HTML is replaced with new HTML and Javascript code. The new HTML and Javascript code can be used for a variety of purposes, e.g., initiating a gallery effect. Any code that can be used within a webpage can be added to the calling webpage by modifying the DOM, enabling the "injection" of various code and scripting, including HTML, Javascript, CSS, Flash, and the like.

Visible Watermarking

In one embodiment, for security, images are automatically "burned" with a user-defined visible watermark. This watermark can be based on any information, such as information corresponding to the end user, the location where the image is to be displayed, the calling web page, the requested image size, or some other parameter.

When an image is first resized and/or reformatted and then added to the server's cache 105, e.g., as described above with respect to FIG. 2, it is possible to add a visible watermark (e.g., during step 207 of FIG. 2). This is done by overlaying, onto the source image, a second image having transparency, to allow some of the original image to show through. The overlaid image is then "flattened" onto the underlying image, thereby creating a new, watermarked image.

Invisible Watermarking

In one embodiment, for security, images are invisibly watermarked by modifying the image so slightly as not to be noticeable. This watermark, which is resilient to image-cropping and resizing, can be read back at a later time to determine whether an image has been copied or "stolen" from an official image hosted by an image server consistent with embodiments of the disclosure.

When an image is first resized and/or reformatted and then added to the server's cache 105, e.g., as described above with respect to FIG. 2, it is possible to add an invisible watermark (e.g., during step 207 of FIG. 2). Invisible watermarks are added using a method similar to that for adding visible watermarks, as discussed above. A typical image for web use contains three channels: Red, Green, and Blue. Typically, when an image is modified in some way, all three channels are affected. This invisible watermark, however, is applied to only one of the three channels. The result is that the output image containing the invisible watermark does not appear to be changed at all, to the ordinary viewing user. However, the overlaid watermark can easily be seen by opening the image in an editor such as Photoshop and viewing the three channels individually.

In some embodiments, multiple watermarks (e.g., two single-channel watermarks on different color channels), are used concurrently, and in other embodiments, the same watermark is used on fewer than all (e.g., two) color channels.

Partial-Image Delivery

In one embodiment, to protect images from being copied, a whole image is not delivered to a browser. Instead, the original source image is split into two or more image parts, which are separately delivered to the browser. To render the image in the user's browser window, the image parts are overlaid in the browser, e.g., using the Javascript library, to give the impression of a complete image. However, if the browser cache is visually inspected, none of the files will show the whole image.

At the time an image is first resized and/or reformatted and then added to the server's cache 105, e.g., as described above with respect to FIG. 2 (e.g., during step 207 of FIG. 2), the two separate image parts are created. The two image parts are then stored separately in the cache 105 of image database 102.

When a URL link (e.g., http://www.yoshki.com/mycompany/myproject/500/375/mylogo.jpg) is used to display the image on a website in a user's browser, as described above, initially only one of the two image parts is sent from the server's cache 105 and displayed on the webpage. This image is then located, and the HTML code that requested the image is replaced with an additional link to the second image part, e.g., using the Javascript library. Using, e.g., HTML and CSS code, the second image part is overlaid over the first image part. This process takes place instantly, and the end user sees what appears to be a normal image shown in the browser, with no indication that what is being shown is, in fact, two separate image parts.

Frequently-Updated Graphics

In one embodiment, a dynamic parameter, such as the date (or date and time, or day of the week), or some other relatively frequently-changing parameter, is "stamped" (e.g., added as a visible or invisible watermark, as described above) onto a hosted image or logo that is stored in image database 102, to deter infringers from copying a logo, design mark, copyrighted design, or other proprietary graphic. One example of a stamp would be a visible date/time stamp watermarked into the image, e.g., using a method as described above. In this manner, the infringer would have to recreate the image daily (or at least frequently) to make the copied graphic appear to be authentic.

Figure 4:
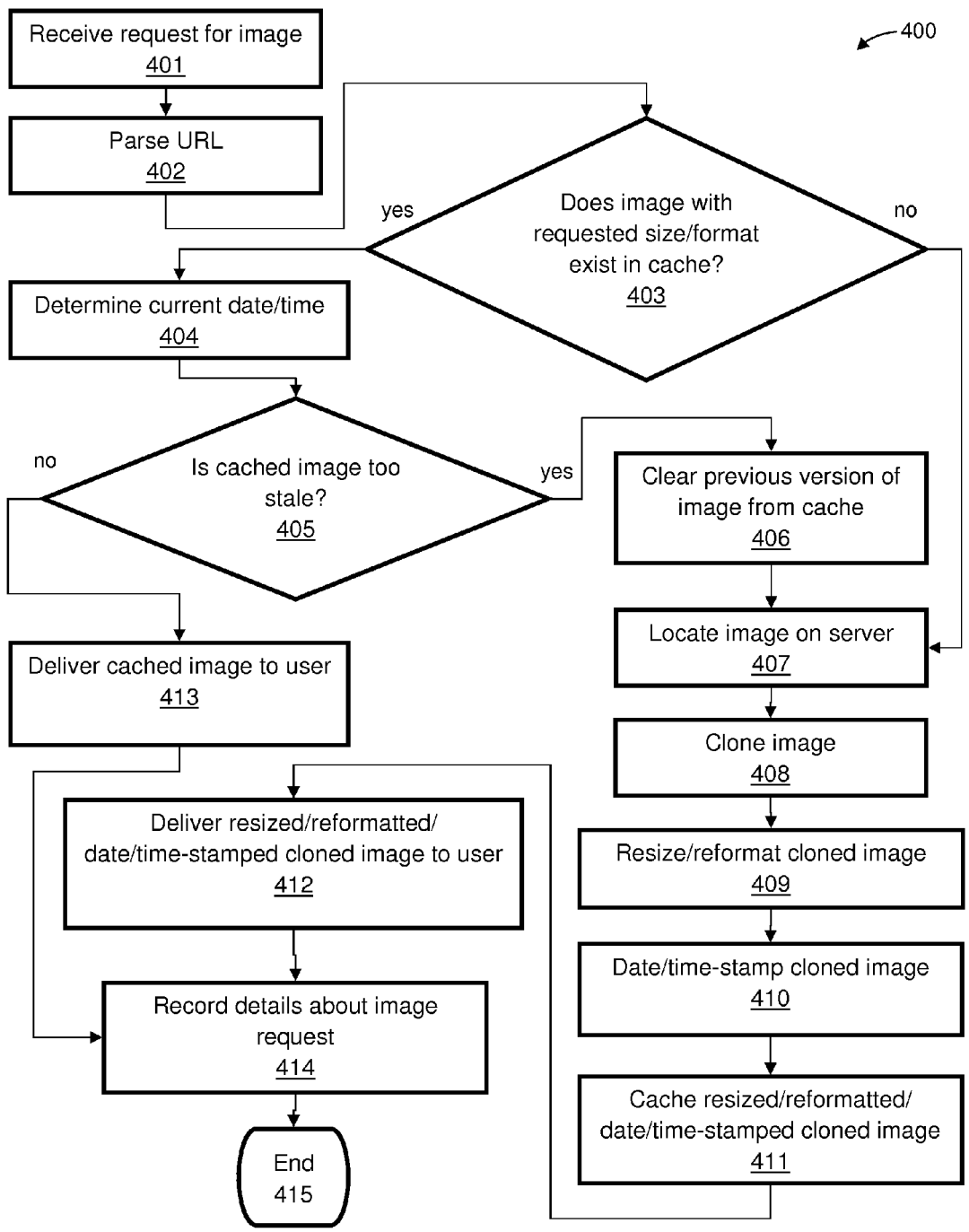
FIG. 4 is a flowchart of an exemplary process for retrieving a stored image having a frequently-changing parameter in a single-source imaging system employing dynamic links, in one embodiment of the disclosure.

FIG. 4 shows a flowchart of an exemplary process 400 for retrieving a stored image having a frequently-changing parameter in a single-source imaging system employing dynamic links, in one embodiment of the disclosure. In this example, the stamp is a visible stamp containing data representing date and time. First, at step 401, image server 101 receives a request to serve an image, where the request is in the form of a URL, such as http://www.yoshki.com/mycompany/myproject/500/375/mylogo.jpg. Next, at step 402, image server 101 parses the URL, looking for height, width, and format information, in order to identify the appropriate output-image parameters. Next, at step 403, image server 101 checks the server's cache 105 of images stored within image database 102, to determine whether an exact image having the requested size and format already exists in the database. If not, then the process continues at step 406. If, at step 403, it is determined that an exact image having the requested size and format already exists in the database, then the process continues at step 404. At step 404, the current date and time is determined, and then, at step 405, a determination is made whether the cached image is too stale based on one or more predetermined time-related criteria (e.g., the image is from an older calendar day, or the image is more than a predetermined number of days or hours old). The determination of staleness is made by examining the date/time stamp contained within the cached image. The date and time that is algorithmically encoded within and/or visually represented by the date stamp is compared with the current date and time determined in step 404. If the comparison indicates that the cached image is too stale, then the process continues at step 406. If the comparison indicates that the cached image is not too stale, then, at step 413, that image is delivered to the user from image server 101, and the process continues at step 414.

At step 406, the previous version of the image, which has been determined to be stale, is cleared from the server's cache 105. Next, at step 407, the source image is located within the repository of image server 101. Next, at step 408, a clone of the source image is made. Next, at step 409, the cloned image is resized and reformatted according to the URL request. Next, at step 410, the cloned image is stamped with the current date and time, as discussed above. At step 411, the resized/reformatted and date/time-stamped cloned image is then stored in the server's cache 105 within image database 102. Next, at step 412, the resized/reformatted and date-stamped cloned image is delivered to the requestor. At step 414, details of the image request are recorded in the server's database, including the referrer details, IP address, date/time, and the like. At step 415, the process terminates.

Absolute Validation

In one embodiment, the browsing user is given the ability to validate, with a single click, the authenticity or legitimacy of the source of an accreditation or authentication logo or other image, such as a design mark, copyrighted design, or other proprietary graphic, to deter infringers. This acts as a deterrent to copying because the infringing copy would not provide the validation functionality and would easily be identifiable as non-authentic.

In one embodiment, the image of an authentication logo is delivered using one or more of the exemplary processes described in further detail above, including right-click control, visible and/or invisible watermarking, partial-image delivery, and frequent updates with a date or other similar frequently-changing parameter. Given these hurdles to infringement, a casual user would already be discouraged or prevented from taking and displaying the image of the authentication logo. The following method for delivering an authenticable logo can be used either alone, or in addition to one or more of the foregoing processes, to provide further security.

Figure 5:
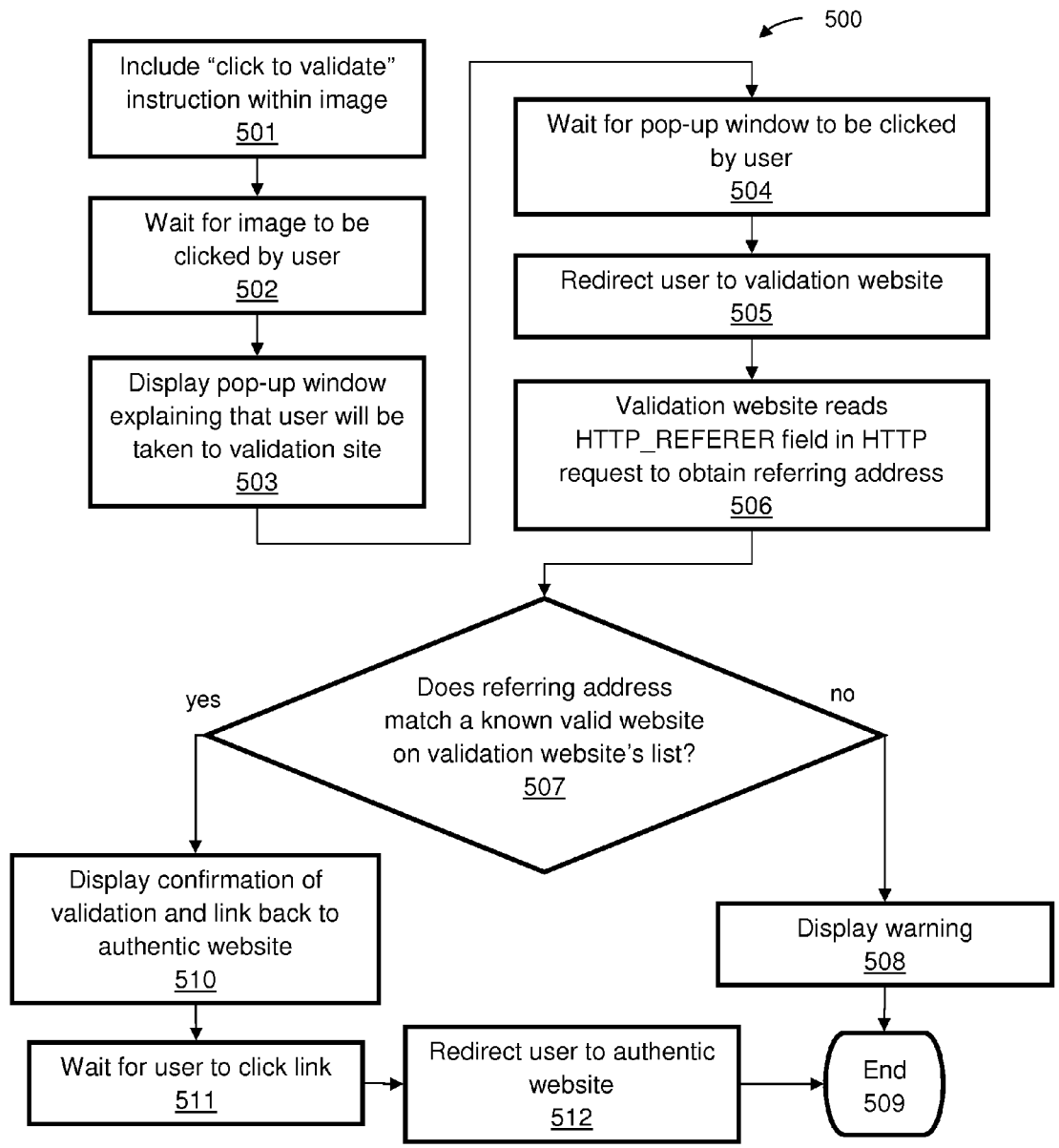
FIG. 5 is a flowchart of an exemplary process for authenticating an image, such as a logo, in one embodiment of the disclosure.

FIG. 5 shows a flowchart of an exemplary process 500 for authenticating an image, such as a logo, in one embodiment of the disclosure. This process is implemented, e.g., using Javascript code on the web page employing the image.

First, at step 501, the image is (typically) graphically designed to contain, within the image itself, an instruction to the viewer to "click to validate," or the like (alternatively, a "click to validate" message could be displayed next to the image, instead of being embedded within the image). Next, at step 502, the process waits for the image to be clicked by a user. Then, at step 503, once the user has clicked on the image, a window pops up, explaining that the user is about to be taken to a validation website and instructing the user to click on the pop-up window to be redirected to the validation site. at step 504, the process waits for a further click from the user, this time on a link contained within the pop-up window. Then, at step 505, after the user has clicked the pop-up window, the user is redirected to the validation website. At step 506, the validation website reads the field HTTP_REFERER, which is a field in the HTTP request that contains the address of the page that referred the user to the validation website, to determine the referring address, i.e., the address of the website hosting the logo. At step 507, the referring address is then compared against a list of known valid websites stored at the validation website. If, at step 507, it is determined that the website's referring address is not recognized as valid based on the list, then the user is warned accordingly at step 508, and the process ends at step 509.

If, at step 507, it is determined that the website's referring address is recognized as valid based on the list, then this validation is confirmed at step 510 by displaying a message to the user. Since it is possible for programmers to modify the HTTP_REFERER contents, this parameter alone might not be reliable. For example, a non-authentic site called "fakemicrosoft.com" might edit the contents of the HTTP_REFERER field to read "microsoft.com". Upon validation, the validation page would tell the user that the website in question claims to be microsoft.com, but to be absolutely sure, instructs the user to click the provided link back to be taken to the real microsoft.com site. By following that link, the user is guaranteed to be on the correct website, rather than the non-authentic site.

Accordingly, for further validation, the message to the user in step 510 indicating that the website appears to be valid also contains a link back to the known valid website. At step 511, the process waits for the user to click on the link in the validation message. Then, at step 512, the user is redirected to the known valid website, and the process ends at step 509.

Alternative Embodiments

A system consistent with one embodiment of the disclosure includes all eight features disclosed above: single-source imaging with dynamic links, right-click control, single-word effects, visible watermarking, invisible watermarking, partial-image delivery, frequently-updated graphics, and absolute validation. Other embodiments of the disclosure include some of the foregoing features, but not all eight of these features. Other embodiments of the disclosure include only a single feature from among the foregoing eight features.

It should be understood that appropriate hardware, software, or a combination of both hardware and software is provided to effect the processing described above, in the various embodiments of the disclosure. It should further be recognized that a particular embodiment might support one or more of the modes of operation described herein, but not necessarily all of these modes of operation.

Although embodiments of the disclosure are described herein in the context of non-motion (i.e., still) graphic images, it should be understood that such embodiments are similarly applicable to other types of data, including images containing animation (such as .GIF formatted data), audio data, video (e.g., Adobe Flash-formatted) data, and multimedia data having both audio and video components (e.g., .AVI and .MPG-formatted data and the like).

It should be understood that various changes in the details, materials, and arrangements of the parts which have been described and illustrated in order to explain the nature of embodiments of the disclosure may be made by those skilled in the art without departing from the scope of the disclosure. For example, it should be understood that the inventive concepts of embodiments of the disclosure may be applied not only in systems for accessing images during a web browsing session, but also in other image-serving and image-retrieval applications for which embodiments of the disclosure may have utility, including the display of images in custom software.

Embodiments of the present disclosure can take the form of methods and apparatuses for practicing those methods. Such embodiments can also take the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the disclosure. Embodiments of the disclosure can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the disclosure. When implemented on a general-purpose processor, the program code segments combine with the processor to provide a unique device that operates analogously to specific logic circuits.

It will be appreciated by those skilled in the art that although the functional components of the exemplary embodiments of the system described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present disclosure. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the disclosure as described herein may be implemented in one or more computers residing on a network transaction server system, and input/output access to embodiments of the disclosure may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, Google Chrome™, or Apple Safar™ HTML Internet-browser software, and/or direct real-time or near-real-time TCP/IP interfaces accessing real-time TCP/IP sockets) for permitting human users to send and receive data, or to allow unattended execution of various operations of embodiments of the disclosure, in real-time and/or batch-type transactions. Likewise, a system consistent with the present disclosure may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, Google Chrome™, or Apple Safar™). Thus, embodiments of the present disclosure may be appropriately adapted to include such communication functionality and Internet browsing ability. Additionally, those skilled in the art will recognize that the various components of the server system of the present disclosure may be remote from one another, and may further include appropriate communications hardware/software and/or LAN/WAN hardware and/or software to accomplish the functionality herein described.

Each of the functional components of embodiments of the present disclosure may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the disclosure may be server-based and may reside on hardware supporting an operating system such as Microsoft Windows NT/2000™ or UNIX.

Components of a system consistent with embodiments of the disclosure may include mobile and non-mobile devices. Mobile devices that may be employed in embodiments of the present disclosure include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the disclosure include 2.5 G cellular network technologies such as GPRS and EDGE, as well as 3 G technologies such as CDMA1xRTT and WCDMA2000, and 4 G technologies. Although mobile devices may be used in embodiments of the disclosure, non-mobile communications devices are also contemplated by embodiments of the disclosure, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to embodiments of the present disclosure. These personal computers may run the Unix, Microsoft Windows NT/2000 or Windows 95/98/NT/ME/CE/2000/XP/Vista/7™ operating systems. The aforesaid functional components of a system according to the disclosure may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present disclosure may also be part of a larger system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present disclosure to achieve additional functionality (e.g., as part of an multifaceted online search engine, data store, image server, service provider, or the like).

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present disclosure include Java, HTML, Pert, UNIX shell scripting, assembly language, Fortran, Pascal, Visual Basic, and QuickBasic. Those skilled in the art will recognize that embodiments of the present disclosure may be implemented in hardware, software, or a combination of hardware and software.

Accordingly, the terms "computer" or "system," as used herein, should be understood to mean a combination of hardware and software components including at least one machine having a processor with appropriate instructions for controlling the processor. The singular terms "computer" or "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present disclosure. Thus, embodiments of the disclosure are intended to cover all such alternatives, modifications, and equivalents as may be included within the spirit and broad scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

I claim:

1. A server-implemented method for providing an image file, the method comprising:

the server receiving a uniform resource locator (URL) containing identification of a requested image file for display within the browser of a user, the URL including one or more criteria specified by at least one of (i) a parameter relating to the size of the image file to provide, and (ii) a parameter relating to the format of the image file to provide;

the server determining whether a cached version of the requested image file satisfying the one or more criteria exists;

if a cached version of the requested image file satisfying the one or more criteria exists, then the server providing the cached version of the requested image file for display within the browser of the user; and if a cached version of the requested image file satisfying the one or more criteria does not exist, then:
- the server generating a processed image file by modifying a stored version of the requested image file based on the one or more criteria;
- the server storing a cached version of the processed image file; and
- the server providing the processed image file for display within the browser of the user, wherein the server is adapted to:
provide the requested image file for display within the browser of the user using multiple image parts transmitted separately, and the multiple image parts are overlaid within the browser to yield a complete image.

2. The method of claim 1, further comprising:
the server determining, using a whitelist or a blacklist, whether to provide the requested image file for display within the browser of the user.

3. The method of claim 1, further comprising:
the server replacing the stored version of the requested image file with an updated version; and
the server clearing one or more cached versions of the requested image file.

4. The method of claim 1, wherein the code for the web page on which the requested image file appears in the user's browser contains instructions for at least one of:
disabling a right-click menu for the requested image file;
replacing the requested image file with an animated version of the image or to create an effect for the image; and
authenticating the source of the requested image file at a validation website.

5. The method of claim 1, further comprising:
the server adding a visible watermark prior to storing a cached version of the processed image file.

6. The method of claim 1, further comprising:
the server adding an invisible watermark to fewer than all color channels prior to storing a cached version of the processed image file.

7. The method of claim 1, further comprising:
the server determining, by comparing the current date and/or time with a parameter corresponding to date and/or time stamped in a cached version of the requested image file, whether to provide the requested image file for display within the browser of the user.

8. The method of claim 7, further comprising:
the server generating an updated cached version of the requested image file having a stamp corresponding to the current date and/or time.

9. A server-implemented method for providing an image file, the method comprising:
the server receiving a uniform resource locator (URL) containing identification of a requested image file for display within the browser of a user, the URL including one or more criteria specified by at least one of (i) a parameter relating to the size of the image file to provide, and (ii) a parameter relating to the format of the image file to provide;

the server determining whether a cached version of the requested image file satisfying the one or more criteria exists;

if a cached version of the requested image file satisfying the one or more criteria exists, then the server providing the cached version of the requested image file for display within the browser of the user; and if a cached version of the requested image file satisfying the one or more criteria does not exist, then:
- the server generating a processed image file by modifying a stored version of the requested image file based on the one or more criteria;
- the server storing a cached version of the processed image file;
- the server providing the processed image file for display within the browser of the user;

and
authenticating the source of the requested image file at a validation website adapted to:
- determine whether the web site on which the requested image file is to appear in the user's browser is on a list of valid sites;
- display the result of the determination to the user; and
- if the web site on which the requested image file is to appear in the user's browser is on a list of valid sites, then provide a user-selectable link to an authentic link for the web site.

10. A system for providing an image file, the system comprising a server adapted to:
receive a uniform resource locator (URL) containing identification of a requested image file for display within the browser of a user, the URL including one or more criteria specified by at least one of (i) a parameter relating to the size of the image file to provide, and (ii) a parameter relating to the format of the image file to provide;

determine whether a cached version of the requested image file satisfying the one or more criteria exists;

if a cached version of the requested image file satisfying the one or more criteria exists, then provide the cached version of the requested image file for display within the browser of the user; and if a cached version of the requested image file satisfying the one or more criteria does not exist, then:
- generate a processed image file by modifying a stored version of the requested image file based on the one or more criteria;
- store a cached version of the processed image file; and
- provide the processed image file for display within the browser of the user, wherein the server is further adapted to:
- provide the requested image file for display within the browser of the user using multiple image parts transmitted separately, and the multiple image parts are overlaid within the browser to yield a complete image.

11. The system of claim 10, wherein the server is further adapted to:
determine, using a whitelist or a blacklist, whether to provide the requested image file for display within the browser of the user.

12. The system of claim 10, wherein the server is further adapted to:
replace the stored version of the requested image file with an updated version; and clear one or more cached versions of the requested image file.

13. The system of claim 10, wherein the code for the web page on which the requested image file appears in the user's browser contains instructions for at least one of:
 disabling a right-click menu for the requested image file;
 replacing the requested image file with an animated version of the image or to create an effect for the image; and
 authenticating the source of the requested image file at a validation website.

14. The system of claim 10, wherein the server is further adapted to:
 add a visible watermark prior to storing a cached version of the processed image file.

15. The system of claim 10, wherein the server is further adapted to:
 add an invisible watermark to fewer than all color channels prior to storing a cached version of the processed image file.

16. The system of claim 10, wherein the server is further adapted to:
 determine, by comparing the current date and/or time with a parameter corresponding to date and/or time stamped in a cached version of the requested image file, whether to provide the requested image file for display within the browser of the user.

17. The system of claim 16, wherein the server is further adapted to:
 generate an updated cached version of the requested image file having a stamp corresponding to the current date and/or time.

18. A system for providing an image file, the system comprising a server adapted to:
 receive a uniform resource locator (URL) containing identification of a requested image file for display within the browser of a user, the URL including one or more criteria specified by at least one of (i) a parameter relating to the size of the image file to provide, and (ii) a parameter relating to the format of the image file to provide;
 determine whether a cached version of the requested image file satisfying the one or more criteria exists;
 if a cached version of the requested image file satisfying the one or more criteria exists, then provide the cached version of the requested image file for display within the browser of the user; and
 if a cached version of the requested image file satisfying the one or more criteria does not exist, then:
  generate a processed image file by modifying a stored version of the requested image file based on the one or more criteria;
  store a cached version of the processed image file; and
  provide the processed image file for display within the browser of the user,
 wherein the server is further adapted to permit a user to authenticate the source of the requested image file at a validation website adapted to:
  determine whether the web site on which the requested image file is to appear in the user's browser is on a list of valid sites;
  display the result of the determination to the user; and
  if the web site on which the requested image file is to appear in the user's browser is on a list of valid sites, then provide a user-selectable link to an authentic link for the web site.

* * * * *